United States Patent [19]

Davis

[11] Patent Number: 4,468,786

[45] Date of Patent: Aug. 28, 1984

[54] NONLINEAR EQUALIZER FOR CORRECTING INTERSYMBOL INTERFERENCE IN A DIGITAL DATA TRANSMISSION SYSTEM

[75] Inventor: Robert C. Davis, Indialantic, Fla.

[73] Assignee: Harris Corporation, Melbourne, Fla.

[21] Appl. No.: 420,886

[22] Filed: Sep. 21, 1982

[51] Int. Cl.³ .............................................. H04B 3/14
[52] U.S. Cl. ....................................... 375/11; 333/18; 364/724
[58] Field of Search ........................ 375/11, 12, 13, 14, 375/15, 16, 34, 57, 58, 60, 99, 101; 333/18; 364/724, 574

[56] References Cited

U.S. PATENT DOCUMENTS

| | | | |
|---|---|---|---|
| 3,633,105 | 4/1972 | Linder et al. | 375/16 |
| 3,727,134 | 4/1973 | Melvin | 375/14 |
| 3,764,914 | 10/1973 | Karnaugh | 375/14 |
| 3,792,356 | 2/1974 | Kobayashi et al. | 375/14 |
| 3,875,515 | 4/1975 | Stuart et al. | 375/14 |
| 4,021,738 | 5/1977 | Gitlin et al. | 375/14 |
| 4,061,978 | 12/1977 | Motley et al. | 375/99 |
| 4,100,495 | 7/1978 | Luvison et al. | 375/14 |
| 4,170,758 | 10/1979 | Tamburelli | 375/12 |
| 4,220,923 | 9/1980 | Pelchat et al. | 375/101 |
| 4,404,600 | 9/1983 | Murakami | 375/34 |
| 4,404,681 | 9/1983 | Hullwegen | 375/11 |
| 4,408,332 | 10/1983 | Sari | 375/99 |

Primary Examiner—Robert L. Griffin
Assistant Examiner—Stephen Chin
Attorney, Agent, or Firm—Antonelli, Terry & Wands

[57] ABSTRACT

A non-linear equalizer corrects for intersymbol interference in a digital data transmission system by introducing baud rate samples into an N-stage tapped delay line and provision is made for storing a sequence of M prior decisions in a prior decision register. Both the samples from the tapped delay line and the contents of the prior decision register are coupled to a weighting matrix processor which is updated to permit adaptation to different channels conditions. When initially placed into operation, a training sequence is coupled to a reference register and differences between arrived-at decisions and the true symbols are employed to provide an error vector which is then used to update the weighting matrix in the processor. Decisions on the data estimates are hard-limited to form a set of M prior decisions which are placed into the prior decision register. The training sequence is employed over a suitable acquisition time so that the weights of the processor matrix will have stabilized at values suitable for the channel through which unknown digital data will be transmitted.

Because the equalizer of the invention is non-linear, it can remove intersymbol interference without the severe noise enhancement problem of linear equalizers on some channels. Moreover, not only can it remove intersymbol interference from both precursors and postcursors, but it has the ability to modify previously made decisions upon the receipt of additional data from the channel.

19 Claims, 2 Drawing Figures

DECISION FEEDBACK EQUALIZER
(PRIOR ART)

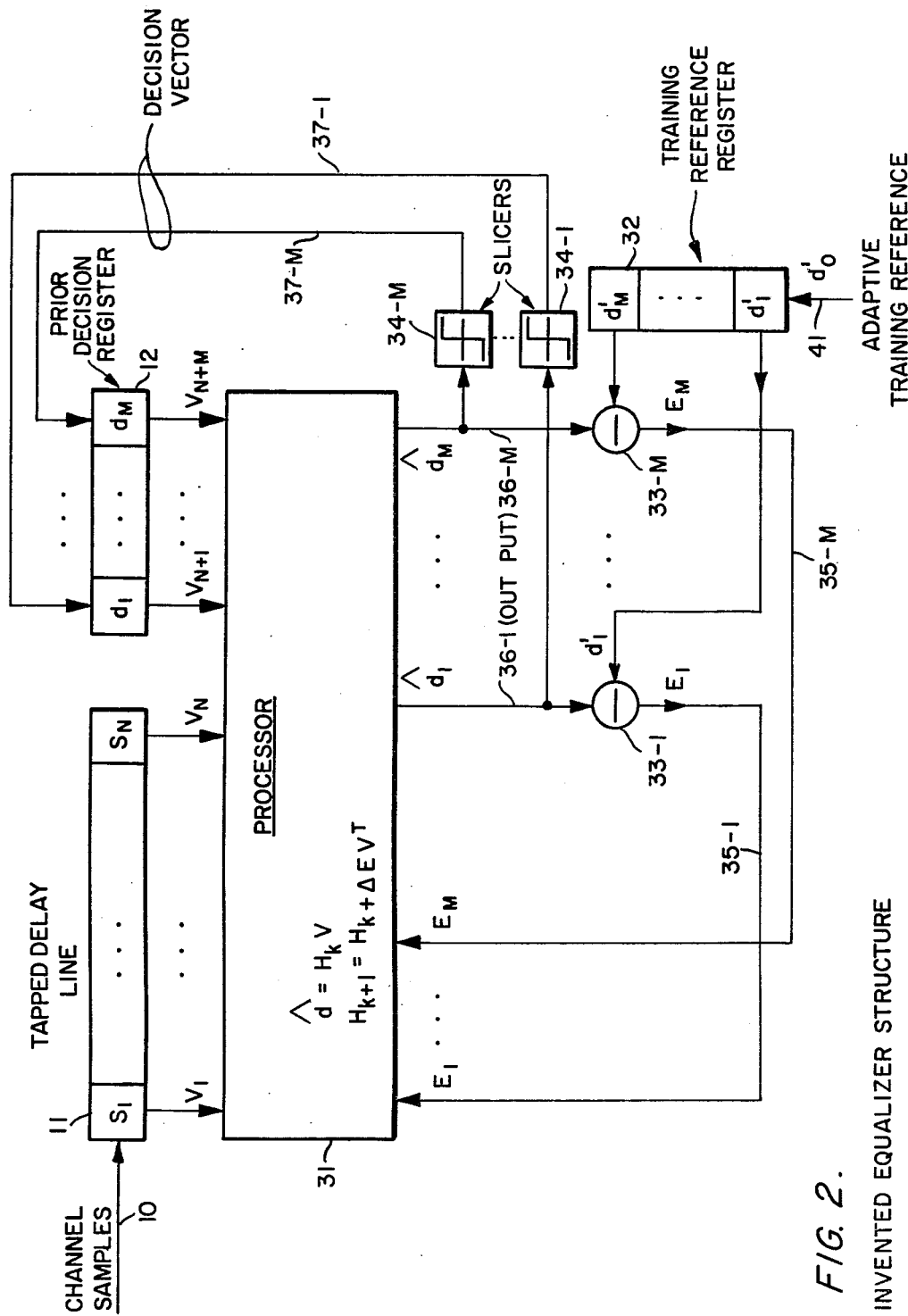
FIG. 2. INVENTED EQUALIZER STRUCTURE

NONLINEAR EQUALIZER FOR CORRECTING INTERSYMBOL INTERFERENCE IN A DIGITAL DATA TRANSMISSION SYSTEM

FIELD OF THE INVENTION

The present invention relates to the correction of the distortion effects of a limited bandwidth data transmission channel on high data rate digital signals and is particularly directed to an improved equalizer which corrects for intersymbol interference.

BACKGROUND OF THE INVENTION

High baud rate digital transmission systems are subject to the problem of intersymbol interference which occurs when digital data is transmitted over a narrow band channel, such as a telephone voice communication channel. Intersymbol interference arises when the digital data symbols are transmitted in such a rapid succession that the channel response to one symbol is not allowed to decay before the next successive symbol is transmitted. As a result, the demodulation of one symbol is affected (or interfered with) due to the decaying channel responses of previously transmitted symbols. Because of the economic advantages of being able to convey increasing amounts of data over a fixed available channel, the elimination of intersymbol interference, thereby permitting higher data rates, becomes of paramount importance.

Over the years, a variety of techniques for correcting for intersymbol interference have been developed. Among these is the adaptive linear transversal filter approach, such as described by R. W. Lucky in an article entitled "Automatic Equalization for Digital Communication" BSTJ, Vol. 44, pages 547-588, April 1965, and an article by J. G. Proakis and J. H. Miller entitled "An Adaptive Receiver for Digital Signalling Through Channels with Intersymbol Interference" IEEE Transactions on Information Theory, Vol. IT-15, pages 484-497, July 1969. Another significant approach to solving the problem was the development of a decision feedback equalizer (DFE), as described in an article by P. Monsen entitled "Feedback Equalization for Fading Dispersive Channels" IEEE Transaction on Information Theory, pages 56-64, January 1971 and an article by M. E. Austin entitled "Equalization of Dispersive Channels Using Decision Feedback" MIT Research Laboratories Electronics, Cambridge, Mass., Quarterly Progress Report No. 84, pages 227-243, April 1967.

More recent significant advances include the recognition that the Viterbi algorithm, which was originally developed for decoding convolutional error correcting codes, as described in an article by A. J. Viterbi, "Error Bounds for Convolutional Codes and an Asymptotically Optimum Decoding Algorithm," IEEE Transactions Information Theory, IT-13, pages 260-269, April 1967, is also applicable to the demodulation of the digital data with intersymbol interference, as described in an article by G. D. Forney, Jr., "Maximum Likelihood Sequence Estimation of Digital Sequences in the Presence of Intersymbol Interference", IEEE Transactions of Information Theory, IT-18, pages 363-378, May 1972.

In addition, adaptive cancellation, as described in an article by A. Gersho and T. L. Lim entitled "Adaptive Cancellation of Intersymbol Interference for Data Transmission" BSTJ, Vol. 60, pages 1997-2021 November, 1981 has been suggested as a promising approach to this problem.

In the context of the variety of approaches for eliminating the problem of intersymbol interference, such as those suggested in the above literature, one must observe the advantages and disadvantages in applying a chosen technique to a data transmission system of interest. For example, a significant technical characteristic of the earlier equalizers, such as described in the above article by R. W. Lucky, is their linearity. Essentially this type of equalizer is a linear filter which operates to boost frequency response in the areas where the channel has a low response and to provide phase compensation. Namely, the overall tandem combination frequency response of the channel and the equalizer is rendered flat by the equalizer. While this approach performs well on channels which either add little noise or do not have significant attenuation in the pass band, on noisy channels which have significant attenuation in the pass band (actually within the Nyquist band), the linear equalizer approach-in providing the frequency response boost at attenuated frequencies-boosts or blows up the noise at those frequencies. This represents a fundamental performance limitation for linear equalizer structures when employed on noisy channels with significant band-limiting or attenuation within the Nyquist band. Adaptive tap gain adjustment algorithms for the linear transversal filter equalizer for such channels actually must be compromised by setting tap gain values which balance the noise blow-up and residual intersymbol interference phenomenon. In other words the linear equalizer will not totally eliminate intersymbol interterence if it has to amplify the noise excessively to do so.

Others of the prior art approaches mentioned above have recognized the performance limitations of linear equalizers and have resorted to non-linear processing in order to achieve improved performance. Examples of these approaches include decision feedback equalizers, The Viterbi algorithm, and adaptive cancellation as described in the Gersho et al article, referenced-above. Essential to all of these non-linear approaches is the use of surrounding symbol decisions to cancel intersymbol interference on a current demodulated pulse. The basic idea is that if the surrounding decisions are correct, then the intersymbol interference can be perfectly removed without noise enhancement, and therein lies the source of their improved performance over linear equalizers. A practical problem with this idea, however, is how to arrive at the surrounding symbol decisions. The manner in which this practical problem is handled provides a key distinction among decision feedback equalizers, adaptive cancellation and the Viterbi algorithm approaches.

More particularly, the decision feedback equalizer simply places additional linear tap gains on previous symbol decisions made by the equalizer. Thus, postcursors of the channel response can be effectively cancelled, whereas precursors cannot be cancelled, since they depend upon symbols not yet determined. As a result, the decision feedback equalizer is most effective on channels which have not significant precursors. An additional performance limitation of the decision feedback equalizer is that no provision is made for changing previously made decisions in the feedback register. This can lead to an error propagation effect, in that an erroneous decision in the feedback register can adversely affect several successive decisions.

The adaptive cancellation equalizer approach attacks the precursor cancellation limitation of the decision feedback equalizer by employing both preceding and subsequent symbol decisions made earlier by a linear equalizer. With delay provided on the raw channel input, the linear equalizer is given sufficient time to make these decisions before the data is supplied to the adaptive cancellation portion of the system.

The Viterbi algorithm processor for demodulating digital data is, perhaps, the most radical approach for providing surrounding decisions for intersymbol interference cancellation. It does so by being extremely thorough in that it does not decide what the surrounding symbols are, but simply keeps track of every possible set of surrounding symbol decisions and ultimately selects the data sequence that leads to the best match between predicted and observed channel outputs. A practical problem with this approach is the exponential increase in complexity with the channel response time duration. Namely, it is suitable only for short duration (in data pulse times) channel responses.

SUMMARY OF THE INVENTION

The present invention circumvents the complexity of the Viterbi algorithm approach, discussed above and focuses upon a non-linear equalizer approach, of the type carried out by decision feedback equalizers. However, contrasted to the inability of the conventional decision feedback equalizer to cancel only postcursors, the present invention is capable also of eliminating precursors and provision is made for changing previously made decisions in the feedback register. Implementationally, the present invention may be considered to be an improved modification or extension of the standard decision feedback equalizer. Baud rate samples are entered into an N-stage tapped delay line, just as in a decision feedback equalizer, and provision is made for storing a sequence of M prior decisions in a prior decision register. Both the samples from the tapped delay line and the contents of the prior decision register are coupled to a weighting matrix processor which is updated to permit adaptation to different channels conditions. When initially placed into operation, a training sequence is coupled to a reference register and differences between arrived-at decisions and the true symbols are employed to provide an error vector which is then used to update the weighting matrix in the processor. Decisions on the data estimates are hard-limited to form a set of M prior decisions which are placed into the prior decision register. The training sequence is employed over a suitable acquisition time so that the weights of the processor matrix will have stabilized at values suitable for the channel through which unknown digital data will be transmitted.

A significant advantage of the present invention is the fact that M successive estimates for an isolated digital bit can be made as it is shifted along the prior decision register. This differs from a conventional decision feedback equalizer approach, wherein once a decision has been made, it cannot be subsequently changed.

Because the equalizer of the invention is non-linear, it can remove intersymbol interference without the severe noise enhancement problem of linear equalizers on some channels. Moreover, as noted-above, not only can it remove intersymbol interference from both precursors and postcursors, but it has the ability to modify previously made decisions upon the receipt of additional data from the channel. Finally, it avoids the hardware complexity of the Viterbi algorithm processor on some channels.

BRIEF DESCRIPTION OF THE DRAWINGS

FIG. 2 is a schematic block diagram of the improved non-linear equalizer of the present invention.

DETAILED DESCRIPTION

Figure 1:
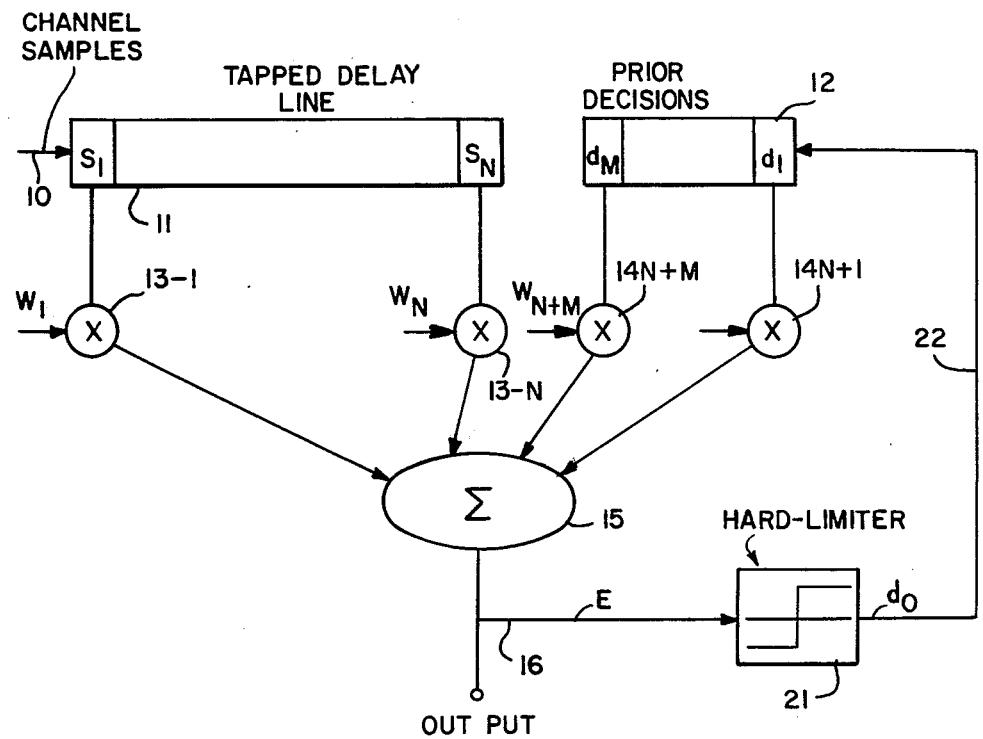
FIG. 1 is a schematic block diagram of a conventional decision feedback equalizer.

Before describing, in detail, the particular improved non-linear equalizer according to the present invention, it should be observed that the invention resides primarily in a novel structural combination of conventional signal processing circuits, and not in the particular detailed configuration thereof. Accordingly, the structure, control and arrangement of these conventional circuits have been illustrated in the drawings by readily understandable block representations and schematic diagrams, which show only those specific details that are pertinent to the present invention, in order not to obscure the disclosure with structural details which will be readily apparent to those skilled in the art having the benefit of the description herein. Thus, the block diagram illustrations in the figures do not necessarily represent the mechanical structural arrangement of the exemplary system, but are primarily intended to illustrate the major structural components in a convenient functional grouping, whereby the present invention may be more readily understood.

In order to appreciate the improvement provided by the present invention, attention is initially directed to FIG. 1 of the drawings which shows a conventional equalizer of the decision feedback type. This equalizer includes a data sample register 11 into which digital data channel samples as from a high frequency modem are entered. This register is configured in the form of a tapped delay line and receives channel inputs at its initial stage $S_1$ that is coupled to input line 10, the successive samples being clocked through an N number of stages $S_1-S_N$. The contents of these successive stages are coupled to respective coefficient multipliers 13-1 . . . 13-N. Second inputs of these multipliers are respectively coupled to receive respective weighting coefficients $W_1$ . . . $W_N$, with the output of each multiplier being applied to an adder 15. The output of adder 15, representing the equalized channel output, is coupled over line 16 to a decision circuit 21, which is effectively comprised of a hard-limiter. The output of the hard-limiter decision circuit 21 is coupled over line 22 to the first stage of a second register 12. Register 12 is an M stage register storing a sequence of prior decisions provided over output line 22. Like the tapped delay line register 11, the contents of each of the successive stages of the prior decision register are coupled to respective coefficient multipliers 14N+1 . . . 14M+M. Weighting coefficients $W_{N+1}$ . . . $W_{N+M}$ are applied to these respective multipliers, the product outputs of which are coupled to adder 15. Weighting coefficients $W_1$ . . . $W_{N+M}$ may be processor-generated in a conventional manner. The details of generating the weighting coefficients is not necessary for an understanding of the operation of the equalizer, as the prior art literature is replete with details of the generation of such weighting coefficients, as those skilled in the art are aware. Moreover, an understanding of the invention does not require an understanding of the mechanism by way of which the weighting coefficients are produced.

In operation, successive samples of digital data that are derived from the narrow band channel of interest are applied to the tapped delay line register 11. These channel samples contain intersymbol interference as a result of the fact that the binary data has been transmitted at a high data rate over the limited bandwidth of the channel, thereby creating precursor and postcursor interference among successive samples. The intersymbol interference created by the channel makes demodulation of the binary data difficult because of the closure of the eye pattern. This eye pattern is hopefully opened at the receiver by the operation of the equalizer which is to reduce the intersymbol interference and thereby allow efficient data decoding by slicing or hard-limiting the equalized data signal derived over line 16.

To accomplish this equalization, the successive channel samples that are shifted through the delay line register 11 are multiplied by weighting coefficients and coupled to adder or summing circuit 15. In addition, the M previous data decision ($d_1 \ldots d_M$) are multiplied by weighting coefficients $W_{N+1} \ldots W_{N+M}$ to further reduce the intersymbol interference caused by prior decisions on the present equalizer output.

Where a significant portion of the intersymbol interference on the currently decoded data symbols is generated by previously decoded data symbols, namely those that are stored in the prior decision register 12, the decision feedback equalizer of FIG. 1 has been shown to be effective on reducing intersymbol interference in the currently decoded samples. A key to the success on these channels is the fact that as long as the data already decoded and stored in the prior decision register 12 is accurate, its effect can be effectively removed from the equalizer output at line 16 by weighting coefficients $W_{N+1} \ldots W_{N+M}$.

A shortcoming of this conventional decision feedback equalizer, which the present invention seeks to remove, is that decisions, once made and stored in the prior decision register 12, cannot be changed or modified in any manner. If an error is made on a decision, it is coupled to the prior decision register and employed thereby for N bit times and can, therefore, negatively impact the equalization of successive bits. Another drawback of the decision feedback equalizer is that channels which have significant intersymbol interference on the present data symbol of interest, due to symbols not yet decoded, and therefore not stored in the prior decision register, can significantly limit its performance.

The drawbacks of the above-described conventional decision feedback equalizer are overcome by the present invention shown in FIG. 2, which is capable of modifying prior decisions which are part of the decision feedback loop, so that errors in such decisions can be compensated and thereby improve the equalization of successive bits.

Like the conventional decision feedback equalizer, the improvement according to the present invention employs a tapped delay line register 11 and a prior decision register 12. Successive stages of these respective registers $S_1 \ldots S_N$ and $\hat{d}_1 \ldots \hat{d}_M$ are coupled to a decision/coefficient processor 31. Processor 31, in addition to multiplying the successive stages of registers 11 and 12 by generated coefficients $W_1 \ldots W_N$ and $W_{N+1} \ldots W_{N+M}$, produces a set of decision estimates $\hat{d}_1 \ldots \hat{d}_M$, in the manner to be decribed below. These decision estimates are applied over lines 36-1 . . . 36-M to a set of subtraction circuits 33-1 . . . 33-M. A further register 32, having the same number of M stages as register 12, is employed to receive a training reference sequence over line 41 during a training mode of operation of the system. The successive M stages of register 32 are coupled as second inputs to each of the subtraction circuits 33-1 . . . 33-M. The difference between the decision estimates and the actually known values clocked through the training sequence register represent error signals $E_1 \ldots E_N$ that are coupled over lines 35-1 . . . 35-M as additional data inputs to the processor 31. These decision errors are employed by the processor to update the weights by which the samples in the tapped delay line register 11 and prior decision register 12 are multiplied, as will be explained in detail below.

Lines 36-1 . . . 36-M, over which the decision estimates $\hat{d}_1 \ldots \hat{d}_M$ are supplied, are coupled to respective hard-limiting decision circuits 34-1 . . . 34-M by way of which decisions are made on the estimates. The outputs of hard-limiters 34-1 . . . 34-M are coupled over lines 37-1 . . . 37-M to the successive stages of prior decision register 12. Considering now the operation of the equalizer of FIG. 2, just as in the conventional decision feedback equalizer, baud rate samples, as from an HF/modem, are coupled over line 10 and clocked into N-stage tapped delay line register 12. Considering both stages of register 11 and register 12, there are a total of N+M data values at any instant that are employed by the processor 31. A total vector of such data values with which the equalizer works may be denoted by $$V = \begin{bmatrix} s_1 \\ s_2 \\ \vdots \\ s_N \\ d_1 \\ d_2 \\ \vdots \\ d_M \end{bmatrix} = \begin{bmatrix} v_1 \\ v_2 \\ \vdots \\ \vdots \\ \vdots \\ \vdots \\ v_{N+M} \end{bmatrix} \quad (1)$$

The vector of M successive decisions may be defined by $$D = \begin{bmatrix} d_1 \\ d_2 \\ \vdots \\ d_M \end{bmatrix} \quad (2)$$

Processor 31 produces estimates of the decision vector D by a vector:

$$\hat{d} = \begin{bmatrix} \hat{d}_1 \\ \hat{d}_2 \\ \vdots \\ \hat{d}_M \end{bmatrix} \quad (3)$$

A further operative of the system is the adaptive training reference sequence that is coupled over line 41 to training reference register 32. This sequence of known decision values may be represented by $$d' = \begin{bmatrix} d_1' \\ d_2' \\ \cdot \\ \cdot \\ \cdot \\ d_M' \end{bmatrix} \quad (4)$$

Finally, an error vector E representative of the difference between the equalizers estimate vector $\hat{d}$ and the adaptive training reference vector d' may be defined by $$E = \begin{bmatrix} (d_1' - \hat{d}_1) \\ (d_2' - \hat{d}_2) \\ \cdot \\ \cdot \\ (d_M' - \hat{d}_M) \end{bmatrix} = \begin{bmatrix} E_1 \\ E_2 \\ \cdot \\ \cdot \\ \cdot \\ E_M \end{bmatrix} \quad (5)$$

As pointed out above, processor 31 employs an Mx(N+M) weighting matrix corresponding to the weighting matrix of the conventional decision feedback equalizer represented by the successive multipliers and summation circuit of FIG. 1, which may be defined as $$H = \begin{bmatrix} h_{11} & h_{12} \ldots h_{1(N+M)} \\ h_{21} & h_{22} & \cdot \\ \cdot & \cdot & \cdot \\ \cdot & \cdot & \cdot \\ h_{M1} & \ldots & h_{M(N+M)} \end{bmatrix} \quad (6)$$

where $h_{ij}$ corresponds to the tap gain on vector setting $V_j$ which contributes to decision $\hat{d}_i$.

Now, in considering the operation carried out by the processor, given the digital data values supplied by the tapped delay line register 11, prior decision register 12 and training reference register 32, with error values $E_1 \ldots E_M$, processor 31 carries out sets of vector multiplications employing such data in accordance with an equation $$\hat{d} = HV \quad (7)$$

The weighting matrix H is updated to permit adaptation for different channel conditions by a procedure defined by the equation $$H_{k+1} = H_k + \Delta E V^T \quad (8)$$

where $H_k$ is the weighting matrix on the $k^{th}$ symbol time of the training period for the training reference supplied to register 32. The parameter $\Delta$ is a small positive constant which, as usual with adaptive equalizer weight adjustments, controls the acquisition time and jitter of the steady state weights.

In the initial portion of system operation, the processor sets all components of the H matrix to zero, with no data being applied over the channel input 10 and no training sequence being applied over line 41. Then, from the transmitter, a known training sequence is transmitted and input samples are coupled over line 10 to tapped delay line register 11. Simultaneously therewith, the known values of the training sequence are coupled over line 41 and clocked through the successive stages of register 32 in synchronization with the clocking of the samples through register 11. Each bit time, a new known bit will be serially shifted into the training reference register 32 as a new channel sample will be clocked into the tapped delayed line register 12. Processor 31 then produces an estimate vector $\hat{d}$ as defined by equation 7, the successive values $\hat{d}_1 \ldots \hat{d}_M$ of which are compared with the known values clocked into the reference register 32. This produces the error vector E by way of which the processor updates the weighting matrix H. The components of the estimate vector $\hat{d}$ are hard-limited by decision circuits 34-1 ... 34-M to form a set of M prior decisions that are clocked into the decision register 12. This operation cycle is repeated over successive bit times during the training sequence until, after a suitable acquisition time, the weights $H_{ij}$ of the H matrix will have stabilized at values suitable for the channel through which unknown digital data is to be transmitted. Then, the training sequence is no longer clocked into the register 32 and the processor simply employs the weights derived in the training sequence for producing the successive decisions $\hat{d}_1 \ldots \hat{d}_M$ as in the conventional decision feedback equalizer. In other words, the processor continues to produce the decision estimates on the basis of the multiplication of the weighting coefficients matrix by the samples in tapped delay line register 11 and the prior decisions in prior decision register 12 as defined by equation (7) except that the error vector is no longer employed to modify the weighting coefficient matrix.

As will be appreciated from the manner in which the present invention shown in FIG. 2 is configured and operates, relative to the conventional decision feedback equalizer as exemplified by the structure shown in FIG. 1, a plurality (here M) of successive estimates of an isolated bit can be made as the bit is shifted through the prior decision register 12. This differs significantly from the prior art configuration shown in FIG. 1, in which once a decision has been made prior to the input in the prior decision register, it cannot be changed subsequently.

As an example how this difference improves the equalization quality, consider a particular isolated bit in the center of the prior decision register. Bit decisions on each side of the isolated bit are available, so that intersymbol interference on future, as well as past, decisions can be cancelled. This contrasts significantly from the decision feedback equalizer shown in FIG. 1 wherein intersymbol interference is cancelled only on the basis of past decisions. This means that the invention offers significant improvement on reducing intersymbol interference in channels which contain interference from both sides of an isolated bit position.

While I have shown and described an embodiment in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are obvious to one of ordinary skill in the art.

What is claimed:

1. A signal processing arrangement for correcting distortion of signals having expected values representative of different symbols which have been transmitted over a communication channel in successive intervals comprising:
- first means for storing a first plurality of data values representative of symbols that have been received from said communication channel during successive intervals of time;
- second means for modifying said first plurality of data values to compensate for the distortion action of said channel and producing a second plurality of data values as estimates of symbols transmitted over said communication channel;
- third means coupled to receive each of said second plurality of data values and generating therefrom a third plurality of data values representative of symbols capable of being transmitted over said communication channel based upon said symbol estimates; and
- fourth means for storing said third plurality of data values and coupling said stored third plurality of data values to said second means; and wherein said second means includes means for modifying said third plurality of data values coupled thereto from said fourth means to compensate for the distortion action of said channel and producing said second plurality of data values in accordance with the modified first plurality and the modified third plurality of data values.

2. A signal processing arrangement according to claim 1, wherein said third means comprises a plurality of non-linear signal processing elements for generating said third plurality of data values in response to the respective values of said second plurality of data values.

3. A signal processing arrangement according to claim 1, wherein said third means comprises means for hard-limiting the respective ones of said second plurality of data values relative to a prescribed threshold value so as to generate said third plurality of data values.

4. A signal processing arrangement according to claim 1, further comprising
- fifth means for storing a fourth plurality of data values representative of actual symbols that have been transmitted over said communication channel, which channel has caused to be actually received the respective symbols represented by said first plurality of data values; and
- sixth means, coupled to receive said second and fourth pluralities of data values and generating therefrom a fifth plurality of data values representative of the difference between said second and fourth pluralities of data values; and wherein
- said second means includes means for modifying said first and third pluralities of data values based upon said fifth plurality of data values.

5. A signal processing arrangement according to claim 1, wherein said first means includes first storage means having a plurality N of sequential stages corresponding in number to said first plurality of data values, into and through which data values representative of symbols that have been received from said communication channel are shifted in sequence, so that said first plurality of data values correspond to the sequence of data values stored in said sequential stages of said first storage means.

6. A signal processing arrangement according to claim 5, wherein said fourth means comprises second storage means having a plurality M of sequential stages corresponding in number to each of second and third pluralities of data values, and into the respective stages of which the respective ones of said third plurality of data values are stored, and wherein the contents of the respective first through M stages of said second storage means are shifted in sequence in accordance with the sequential shift of said first plurality of data values through said first storage means.

7. A signal processing arrangement according to claim 4, wherein said first means includes first storage means having a plurality N of sequential stages corresponding in number to said first plurality of data values, into and through which data values representative of symbols that have been received from said communication channel are shifted in sequence, so that said first plurality of data values correspond to the sequence of data values stored in said sequential stages of said first storage means.

8. A signal processing arrangement according to claim 7, wherein said fourth means comprises second storage means having a plurality M of sequential stages corresponding in number to each of second and third pluralities of data values, and into the respective stages of which the respective ones of said third plurality of data values are stored, and wherein the contents of the respective first through M stages of said second storage means are shifted in sequence in accordance with the sequential shift of said first plurality of data values through said first storage means.

9. A signal processing arrangement according to claim 8, wherein said fifth means comprises third storage means having a plurality M of sequential stages into and through which data values representative of actual symbols that have been transmitted over said communication channel are shifted in sequence in accordance with the sequential shift of said first plurality of data values through said first storage means, so that said fourth plurality of data values correspond to the sequence of data values stored in the sequential stages of said third storage means.

10. A signal processing arrangement according to claim 9, wherein $M < N$.

11. A method for correcting distortion of signals having expected values representative of different symbols which have been transmitted over a communication channel in successive intervals comprising the steps of:
- (a) storing a first plurality of data values representative of symbols that have been received from said communication channel during successive intervals of time;
- (b) modifying said first plurality of data values to compensate for the distortion action of said channel and producing a second plurality of data values as estimates of symbols transmitted over said communication channel;
- (c) generating a third plurality of data values representative of symbols capable of being transmitted over said communication channel based upon said symbol estimates produced in step (b); and wherein step (b) includes modifying said third plurality of data values to compensate for the distortion action of said channel and producing said second plurality of data values in accordance with the modified first plurality and the modified third plurality of data values.

12. A method according to claim 11, wherein step (c) comprises hard-limiting the respective ones of said second plurality of data values relative to a prescribed threshold value so as to generate said third plurality of data values.

13. A method according to claim 11, further comprising the steps of
  (d) storing a fourth plurality of data values representative of actual symbols that have been transmitted over said communication channel, which channel has caused to be actually received the respective symbols represented by said first plurality of data values; and
  (e) generating therefrom a fifth plurality of data values representative of the difference between said second and fourth pluralities of data values; and wherein
  step (b) includes modifying said first and third pluralities of data values based upon said fifth plurality of data values.

14. A method according to claim 11, step (a) comprises storing said first plurality of data in first storage means having a plurality N of sequential stages corresponding in number to said first plurality of data values, by inputting and shifting said first plurality of data values representative of symbols that have been received from said communication channel are shifted in sequence, so that said first plurality of data values correspond to the sequence of data values stored in said sequential stages of said first storage means.

15. A method according to claim 14, wherein step (c) comprises storing said third plurality of data values in respective stages pf second storage means having a plurality M of sequential stages corresponding in number to each of second and third pluralities of data values, and shifting the contents of the respective first through M stages of said second storage means in sequence in accordance with the sequential shift of said first plurality of data values through said first storage means in step (a).

16. A method according to claim 13, step (a) comprises storing said first plurality of data in first storage means having a plurality N of sequential stages corresponding in number to said first plurality of data values, by inputting and shifting said first plurality of data values representative of symbols that have been received from said communication channel are shifted in sequence, so that said first plurality of data values correspond to the sequence of data values stored in said sequential stages of said first storage means.

17. A method according to claim 16, wherein step (c) comprises storing said third plurality of data values in respective stages of second storage means having a plurality M of sequential stages corresponding in number to each of second and third pluralities of data values, and shifting the contents of the respective first through M stages of said second storage means in sequence in accordance with the sequential shift of said first plurality of data values through said first storage means in step (a).

18. A method according to claim 17, wherein step (c) comprises storing said third plurality of data values in respective stages of second storage means having a plurality M of sequential stages corresponding in number to each of second and third pluralities of data values, and shifting the contents of the respective first through M stages of said second storage means in sequence in accordance with the sequential shift of said first plurality of data values through said first storage means in step (a).

19. A method according to claim 18, wherein $M<N$.

* * * * *